United States Patent
Bossio et al.

(10) Patent No.: US 10,239,556 B2
(45) Date of Patent: Mar. 26, 2019

(54) MAGNETORHEOLOGICAL-DAMPER-BASED STEERING APPARATUS AND METHODS FOR REDUCING STEERING WHEEL JERK RESULTING FROM OFF-ROAD WHEEL IMPACT

(71) Applicant: Ford Global Technologies, LLC, Dearborn, MI (US)

(72) Inventors: Geoffrey Bossio, Beverly Hills, MI (US); Chris M Paiva, Novi, MI (US); Steven Thompson, Royal Oak, MI (US); Zachary Grifka, Howell, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 134 days.

(21) Appl. No.: 15/587,658

(22) Filed: May 5, 2017

(65) Prior Publication Data
US 2018/0319435 A1   Nov. 8, 2018

(51) Int. Cl.
| B62D 7/22 | (2006.01) |
| F16F 9/53 | (2006.01) |
| B62D 15/02 | (2006.01) |
| F16F 15/00 | (2006.01) |

(52) U.S. Cl.
CPC .......... *B62D 7/224* (2013.01); *B62D 15/022* (2013.01); *F16F 9/535* (2013.01); *F16F 15/002* (2013.01); *F16F 15/005* (2013.01); *F16F 2222/06* (2013.01); *F16F 2224/045* (2013.01)

(58) Field of Classification Search
None
See application file for complete search history.

(56) References Cited

U.S. PATENT DOCUMENTS

| 6,095,295 | A | * | 8/2000 | Park | ........................ | F16F 9/535 |
| | | | | | | 188/267.2 |
| 6,464,050 | B2 | | 10/2002 | Smith, Jr. et al. | | |
| 6,547,043 | B2 | * | 4/2003 | Card | ...................... | B62D 7/224 |
| | | | | | | 188/267.2 |
| 6,637,558 | B2 | | 10/2003 | Oliver et al. | | |
| 6,679,508 | B2 | | 1/2004 | Smith, Jr. et al. | | |
| 6,752,425 | B2 | | 6/2004 | Loh et al. | | |

(Continued)

FOREIGN PATENT DOCUMENTS

| CN | 201437372 | 4/2010 |
| KR | 20100029890 | 3/2010 |

*Primary Examiner* — Rami Khatib
(74) *Attorney, Agent, or Firm* — Ray Coppiellie; Hanley, Flight & Zimmerman, LLC

(57) ABSTRACT

Magnetorheological-damper-based steering apparatus and methods for reducing steering wheel jerk resulting from off-road wheel impact are described. An example steering damper apparatus includes a magnetorheological (MR) rotary damper to be operatively coupled to a steering column shaft. The example steering damper apparatus further includes a sensor to detect an angular velocity associated with the steering column shaft. The example steering damper apparatus further includes a controller to energize the MR rotary damper in response to determining that the angular velocity exceeds an angular velocity threshold. The angular velocity threshold is associated with steering wheel jerk resulting from an off-road wheel impact.

20 Claims, 6 Drawing Sheets

(56) References Cited

U.S. PATENT DOCUMENTS

| | | | |
|---|---|---|---|
| 7,823,708 B2 | 11/2010 | Maranville et al. | |
| 7,874,564 B2 | 1/2011 | Lueker, Jr. | |
| 2001/0054527 A1* | 12/2001 | Card | B62D 7/224 |
| | | | 188/267.1 |
| 2003/0085086 A1* | 5/2003 | Oliver | B62D 7/224 |
| | | | 188/267.1 |
| 2005/0082107 A1* | 4/2005 | Husain | B62D 5/005 |
| | | | 180/402 |
| 2007/0023244 A1* | 2/2007 | Carlson | A47C 1/03 |
| | | | 188/267 |
| 2009/0312909 A1* | 12/2009 | Onuma | B62D 6/007 |
| | | | 701/41 |
| 2015/0081173 A1* | 3/2015 | Uselmann | B62D 5/0466 |
| | | | 701/41 |

\* cited by examiner

CORRELATION TABLE 400

| DETECTED ANGULAR VELOCITY (°/s) | ELECTRIC CURRENT OF CONTROL SIGNAL (A) | RESULTANT OUTPUT TORQUE (N·m) |
|---|---|---|
| 500 | 0.15 | 3.0 |
| 800 | 0.30 | 4.5 |
| 1100 | 0.45 | 6.0 |
| 1400 | 0.60 | 7.5 |
| 1700 | 0.75 | 9.0 |
| 2000 | 0.90 | 10.5 |
| 2300 | 1.05 | 12.0 |
| 2600 | 1.20 | 13.5 |
| 2900 | 1.35 | 15.0 |
| 3200 | 1.50 | 16.5 |

FIG. 4

MAGNETORHEOLOGICAL-DAMPER-BASED STEERING APPARATUS AND METHODS FOR REDUCING STEERING WHEEL JERK RESULTING FROM OFF-ROAD WHEEL IMPACT

FIELD OF THE DISCLOSURE

This disclosure relates generally to magnetorheological-damper-based steering apparatus and methods and, more particularly, to magnetorheological-damper-based steering apparatus and methods for reducing steering wheel jerk resulting from off-road wheel impact.

BACKGROUND

Vehicles traveling in off-road environments (e.g., desert driving) may encounter and/or engage large obstacles (e.g., rocks, potholes, ruts, etc.). When one or more steered wheel(s) of the vehicle impact such obstacles, particularly while the vehicle is traveling at a high rate of speed and/or while the brakes of the vehicle are being aggressively applied, the resultant forces from the impact cause the steering wheel of the vehicle to jerk violently. Steering wheel jerk arising under such conditions may result in temporary loss of directional control of the vehicle, and may additionally and/or alternatively result in injury to the driver of the vehicle.

SUMMARY

Magnetorheological-damper-based steering apparatus and methods for reducing steering wheel jerk resulting from off-road wheel impact are disclosed herein. In some examples, a steering damper apparatus is disclosed. In some disclosed examples, the steering damper apparatus comprises a magnetorheological (MR) rotary damper to be operatively coupled to a steering column shaft. In some disclosed examples, the steering damper apparatus comprises a sensor to detect an angular velocity associated with the steering column shaft. In some disclosed examples, the steering damper apparatus comprises a controller to energize the MR rotary damper in response to determining that the angular velocity exceeds an angular velocity threshold. In some disclosed examples, the angular velocity threshold is associated with steering wheel jerk resulting from an off-road wheel impact.

In some disclosed examples, a method for educing steering wheel jerk resulting from off-road wheel impact is disclosed. In some disclosed examples, the method comprises detecting, via a sensor, an angular velocity associated with a steering column shaft. In some disclosed examples, the method comprises comparing, by executing one or more instructions via a controller, the angular velocity to an angular velocity threshold. In some disclosed examples, the angular velocity threshold is associated with steering wheel jerk resulting from an off-road wheel impact. In some disclosed examples, the method comprises energizing, by executing one or more instructions via the controller, a magnetorheological (MR) rotary damper in response to determining that the angular velocity exceeds the angular velocity threshold. In some disclosed examples, the MR rotary damper is operatively coupled to the steering column shaft.

In some examples, a tangible machine readable storage medium comprising instructions is disclosed. In some disclosed examples, the instructions, when executed, cause a controller to compare an angular velocity detected via a sensor to an angular velocity threshold. In some disclosed examples, the angular velocity is associated with a steering column shaft. In some disclosed examples, the angular velocity threshold is associated with steering wheel jerk resulting from an off-road wheel impact. In some disclosed examples, the instructions, when executed, cause the controller to energize a magnetorheological (MR) rotary damper in response to determining that the angular velocity exceeds the angular velocity threshold. In some disclosed examples, the MR rotary damper is operatively coupled to the steering column shaft.

BRIEF DESCRIPTION OF THE DRAWINGS

FIG. 4 illustrates an example correlation table utilized by the example controller of FIG. 2.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Vehicles traveling in off-road environments (e.g., desert driving) may encounter and/or engage large obstacles (e.g., rocks, potholes, ruts, etc.). When one or more steered wheels) of the vehicle impact such obstacles, particularly while the vehicle is traveling at a high rate of speed and/or while the brakes of the vehicle are being aggressively applied, the resultant forces from the impact cause the steering wheel of the vehicle to jerk violently. As used herein, the term "steering wheel jerk" refers to excessive, sudden, rotational movement of the steering wheel at a high angular velocity. For example, a steering wheel jerk may correspond to a measured angular velocity of the steering wheel in excess of 500 degrees per second. Steering wheel jerk may result in temporary loss of directional control of the vehicle, and may additionally and/or alternatively result in injury to the driver of the vehicle. Conventional steering systems are not equipped with a mechanism to mitigate and/or dampen occurrences of steering wheel jerk.

Unlike conventional steering systems lacking the ability to mitigate and/or dampen occurrences of steering wheel jerk, the magnetorheological-damper-based steering apparatus and methods disclosed herein advantageously reduce steering wheel jerk resulting from off-road wheel impact. For example, the disclosed magnetorheological-damperbased steering apparatus and methods incorporate a magnetorheological (MR) rotary damper to dampen occurrences of steering wheel jerk, thereby reducing the potential for temporary loss of directional control of the vehicle, and/or injury to the driver of the vehicle, that exist in connection with conventional steering systems. The disclosed steering apparatus and methods include an MR rotary damper that is energized by a controller in response to the controller determining that a measured angular velocity associated with a steering wheel and/or a steering column shaft of the steering apparatus exceeds an angular velocity threshold corresponding to an occurrence of steering wheel jerk.

Figure 1:
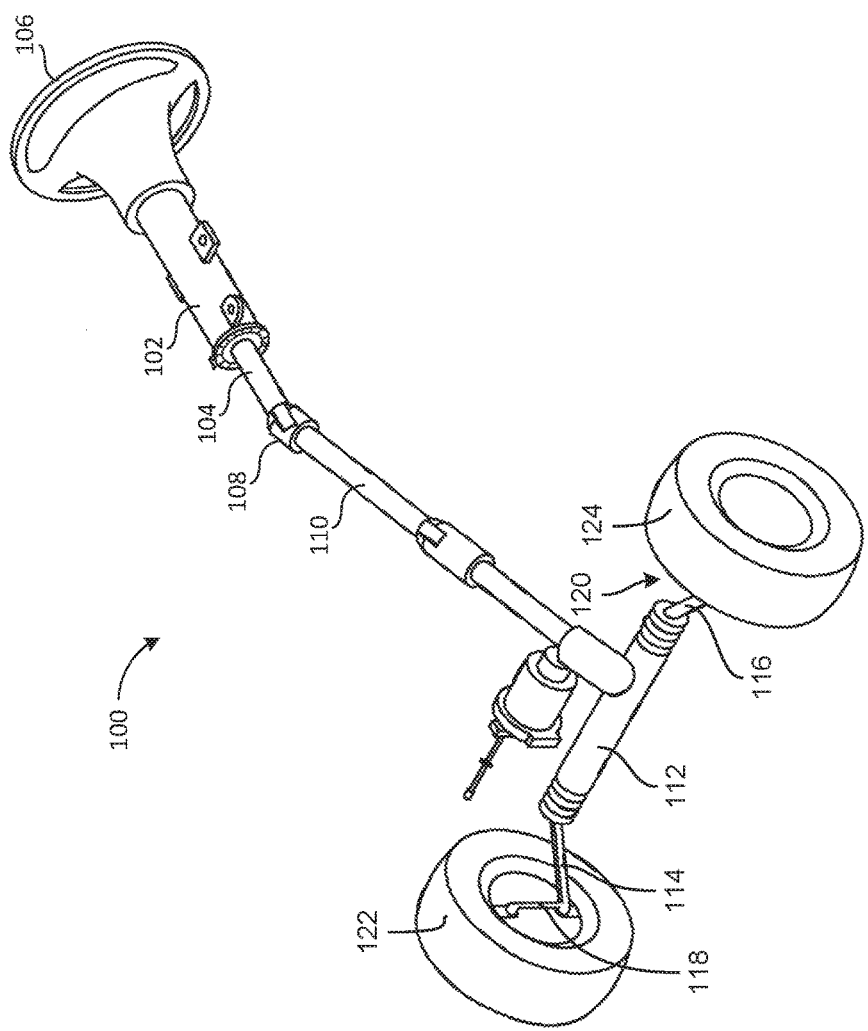
FIG. 1 is a schematic illustration of a known steering apparatus.

FIG. 1 is a perspective view of a known steering apparatus 100. The steering apparatus 100 of FIG. 1 includes a steering column assembly 102 having a steering column shaft 104. The steering apparatus 100 further includes a steering wheel 106, a universal joint 108, an intermediate shaft 110, a steering pinion gear (hidden in FIG. 1), a rack 112, a first tie rod 114, a second tie rod 116, a first knuckle 118, a second knuckle 120, a first wheel 122, and a second wheel 124.

The steering wheel 106 is connected to a first end of the steering column shaft 104 of the steering column assembly 102. A second end of the steering column shaft 104 opposite the first end is connected to the intermediate shaft 110 via the universal joint 108. The intermediate shaft 110 is coupled to the rack 112 via the steering gear pinion. Opposing ends of the rack 112 are respectively connected to the first and second tie rods 114, 116. The first and second tie rods 114, 116 are respectively connected to corresponding ones of the first and second knuckles 118, 120. The first and second wheels 122, 124 are respectively rotatably engaged with corresponding ones of the first and second knuckles 118, 120.

When the first wheel 122 and/or the second wheel 124 of the steering apparatus 100 of FIG. 1 impact(s) a large obstacle (e.g., a rock, a pothole, a rut, etc.), the resultant forces from the impact are transferred from the first wheel 122 and/or second wheel 124 to the rack 112, thereby causing the rack 112 to translate. The translational movement of the rack 112 results in rotational movement of the steering pinion gear. The rotational movement of the steering pinion gear is transferred from the steering pinion gear, through the intermediate shaft 110, through the universal joint, 108, through the steering column shaft 104, and to the steering wheel 106. Thus, when the first wheel 122 and/or the second wheel 124 of the steering apparatus 100 of FIG. 1 impact(s) a large obstacle, the resultant forces from the impact may cause the steering wheel 106 of the steering apparatus 100 to jerk violently.

Figure 2:
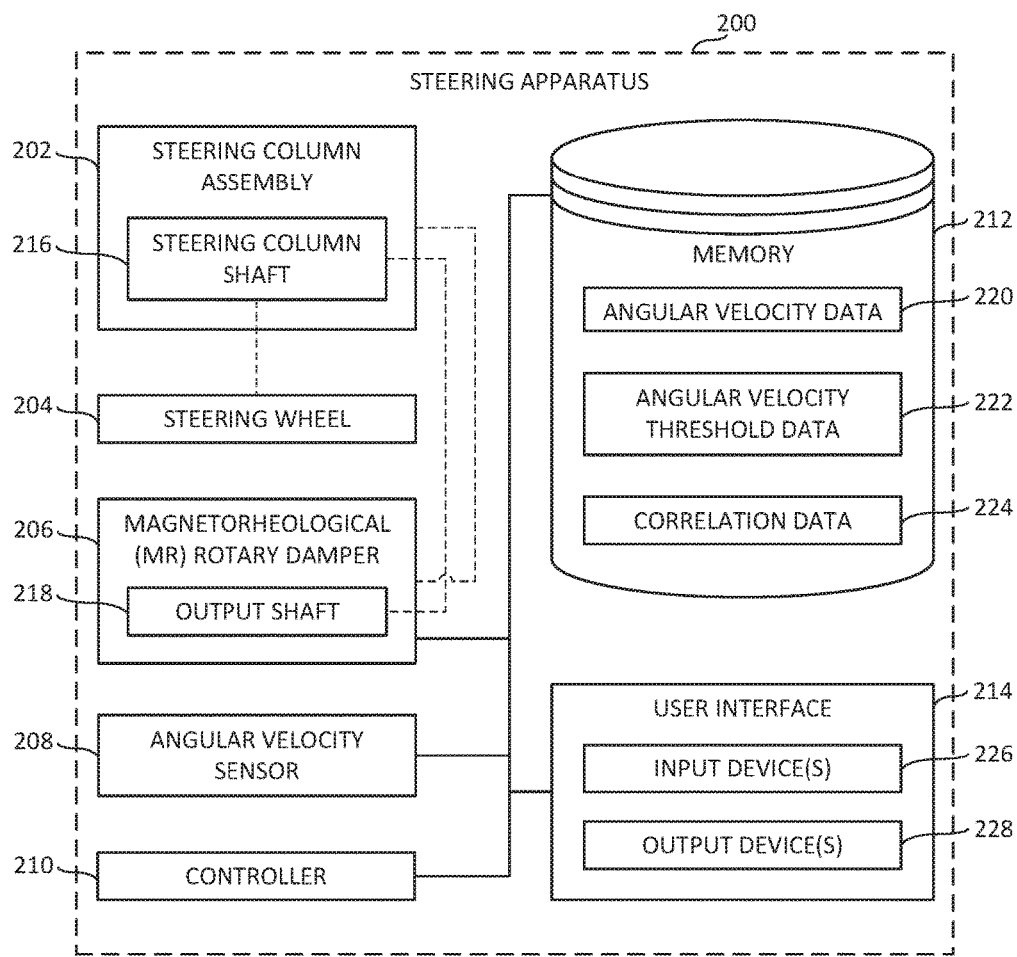
FIG. 2 is a block diagram of an example steering apparatus constructed in accordance with the teachings of this disclosure for reducing steering wheel jerk resulting from off-road wheel impact.

FIG. 2 is a block diagram of an example steering apparatus 200 constructed in accordance with the teachings of this disclosure for reducing steering wheel jerk resulting from off-road wheel impact. The steering apparatus 200 of FIG. 2 includes an example steering column assembly 202, an example steering wheel 204, an example magnetorheological (MR) rotary damper 206, an example angular velocity sensor 208, an example controller 210, an example memory 212, and an example user interface 214. Other example implementations of the steering apparatus 200 of FIG. 2 may include fewer or additional structures in accordance with the teachings of this disclosure. For example, the steering apparatus 200 may further include any number of universal joints, intermediate shafts, steering pinion gears, racks, tie rods, knuckles and/or wheels coupled (e.g., directly or indirectly) to the steering column assembly 202 of FIG. 2. The steering column assembly 202, the steering wheel 204, the MR rotary damper 206, the angular velocity sensor 208, the controller 210, the memory 212, and the user interface 214 of the steering apparatus 200 of FIG. 2 may be of any size(s), shape(s) and/or configuration(s) that enable(s) the steering apparatus 200 to be implemented in and/or on a vehicle.

The example steering column assembly 202 of FIG. 2 includes an example steering column shaft 216. The steering column shaft 216 is rotatably coupled to the steering column assembly 202 such that the steering column shaft 216 is rotatable relative to a housing of the steering column assembly 202. The example steering wheel 204 of FIG. 2 is coupled (e.g., directly or indirectly) to the steering column shaft 216 such that rotation of the steering wheel 204 results in rotation of the steering column shaft 216, and vice-versa. In some examples, the steering columnar assembly 202, the steering columnar shaft 216, and the steering wheel 204 of FIG. 2 may be implemented in a manner consistent with the arrangement of the steering column assembly 102, the steering column shaft 104, and the steering wheel 106 shown in FIG. 1.

The example MR rotary damper 206 of FIG. 2 includes a housing, an electromagnet, MR fluid, and an example output shaft 218. The housing confines and/or houses the electromagnet and the MR fluid of the MR rotary damper 206. When electric current is provided to the electromagnet, the electromagnet generates a magnetic field that is applied to the MR fluid of the MR rotary damper 206. The applied magnetic field changes the fluid properties (e.g., viscosity and/or shear strength) of the MR fluid. The output shaft 218 of the MR rotary damper 206 is operatively coupled to the MR fluid and rotatably coupled to the housing of the MR rotary damper 206. As the fluid properties of the MR fluid change in response to the applied magnetic field, a corresponding change in damping force and/or output torque occurs at the output shaft 218. Thus, increasing the magnitude of the electric current provided to the electromagnet increases the magnitude and/or strength of the magnetic field generated by the electromagnet, which in turn increases the viscosity and/or shear strength of the MR fluid, which in turn increases the damping force and/or output torque produced at the output shaft 218 of the MR rotary damper 206.

In some examples, the output torque and/or damping force produced at the output shaft 218 of the MR rotary damper 206 may be applied to the steering column shaft 216 of FIG. 2. In other examples, the output torque and/or damping force produced at the output shaft 218 of the MR rotary damper 206 may be applied to one or more other rotatable component(s) (e.g., an intermediate shaft, a steering pinion gear, etc.) that may be coupled (e.g., directly or indirectly) to the steering column shaft 216 and/or the steering wheel 204 of the steering apparatus 200 of FIG. 2. In some examples, the output torque and/or damping force produced at the output shaft 218 of the MR rotary damper 206 is variable. For example, the output torque may increase as the electric current provided to the electromagnet increases. In some examples, the output torque produced at the output shaft 218 of the MR rotary damper 206 in response to the electromagnet applying a magnetic field to the MR fluid may vary between three Newton meters (3 N·m) and fifteen Newton meters (15 N·m).

Figure 3:
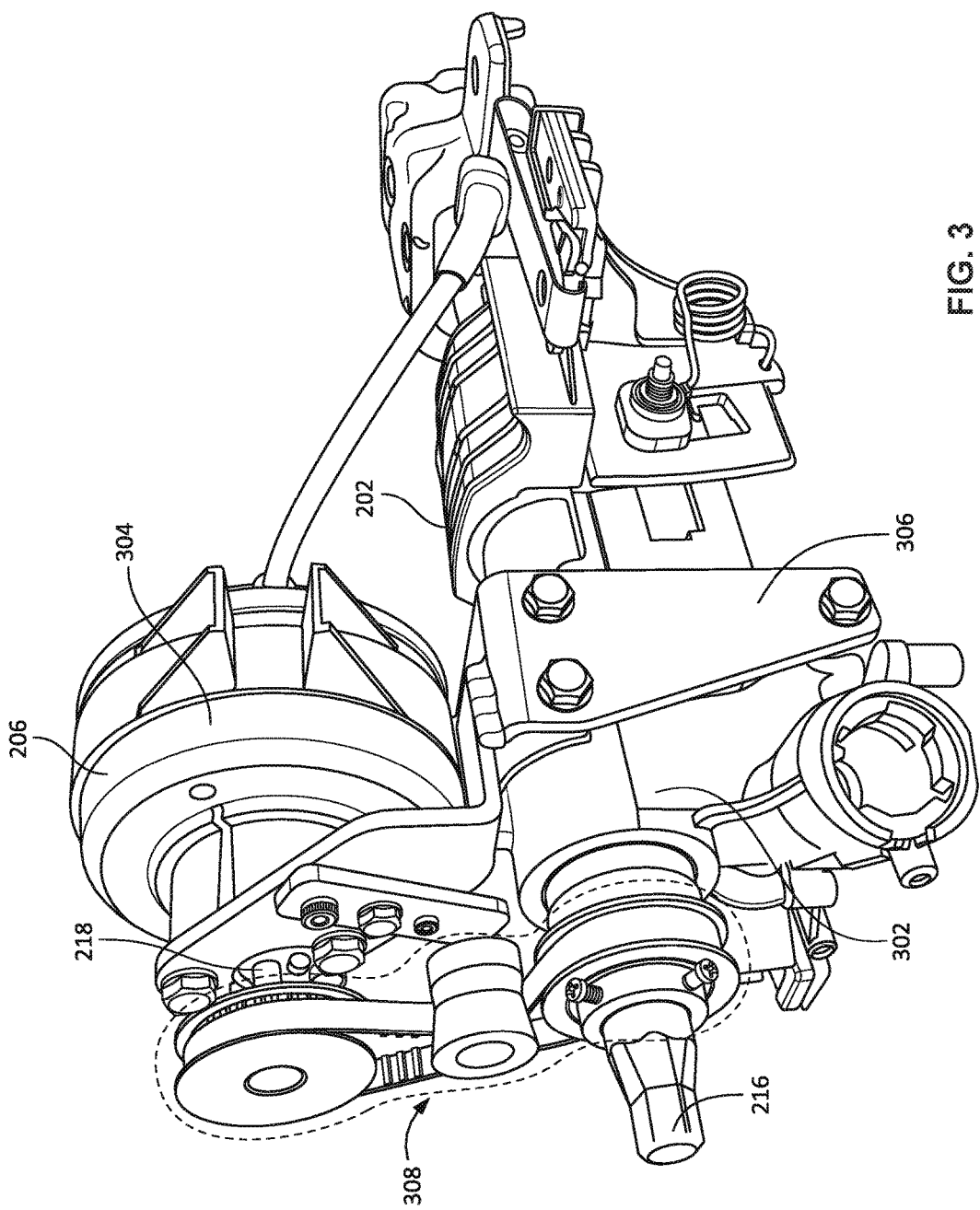
FIG. 3 illustrates the example magnetorheological (MR) rotary damper of FIG. 2 mounted to the example steering column assembly of FIG. 2.

In some examples, the MR rotary damper 206 of FIG. 2 is mounted to the steering column assembly 202 of FIG. 2. For example, FIG. 3 illustrates the MR rotary damper 206 of FIG. 2 mounted to the steering column assembly 202 of FIG. 2. The steering column assembly 202 of FIG. 3 includes the steering column shaft 216 and an example steering column housing 302. The steering column shaft 216 is rotatable relative to the steering column housing 302. The MR rotary damper 206 of FIG. 3 includes the output shaft 218 and an example damper housing 304. The output shaft 218 is rotatable relative to the damper housing 304. In the illustrated example of FIG. 3, the damper housing 304 of the MR rotary damper 206 is mounted to the steering column housing 302 of the steering column assembly 202 via an example mounting bracket 306.

When the MR rotary damper 206 is mounted to the steering column assembly 202 as shown in FIG. 3, the output shaft 218 of the MR rotary damper 206 is offset from the steering column shaft 216 of the steering column assembly 202. In the illustrated example of FIG. 3, the output shaft 218 of the MR rotary damper 206 is operatively coupled to the steering column shaft 216 of the steering column assembly 202 via an example belt and pulley system 308. The belt and pulley system 308 transfers an output torque from the output shaft 218 of the MR rotary damper to the steering column shaft 216 of the steering column assembly 202. The belt and pulley system 308 may include any number of belt(s) and/or pulley(s). In other examples, the output shaft 218 of the MR rotary damper 206 may be operatively coupled to the steering column shaft 216 of the steering column assembly 202 via a gear system including any number of engaged gears that transfer an output torque from the output shaft 218 of the MR rotary damper to the steering column shaft 216 of the steering column assembly 202.

While FIG. 3 illustrates the MR rotary damper 206 mounted to the steering column assembly 202, the MR rotary damper 206 may alternatively be mounted to and/or integrated with a different component (e.g., an intermediate shaft, a steering pinion gear, etc.) that may be operatively coupled (e.g., directly or indirectly) to the steering column shaft 216 and/or the steering wheel 204 of the steering apparatus 200 of FIG. 2.

Returning to the example of FIG. 2, the angular velocity sensor 208 of FIG. 2 senses, measures and/or detects an angular velocity (e.g., rate of rotation) associated with the steering wheel 204 and/or the steering column shaft 216 of the steering apparatus 200 of FIG. 2. For example, the angular velocity sensor 208 may sense, measure and/or detect an angular velocity of the steering column shaft 216 coupled to the steering wheel 204. In other examples, the angular velocity sensor 208 may sense, measure and/or detect an angular velocity of one or more other rotatable component(s) (e.g., an intermediate shaft, a steering pinion gear, etc.) that may be coupled (e.g., directly or indirectly) to the steering column shaft 216 and/or the steering wheel 204 of the steering apparatus 200 of FIG. 2.

Different angular velocity values sensed, measured and/or detected by the angular velocity sensor 208 correspond to different rates of rotation of the steering wheel 204. Thus, by sensing, measuring and/or detecting angular velocity values, the angular velocity sensor 208 detects rate of rotation values associated with an occurrence and/or absence of steering wheel jerk at the steering wheel 204. Example angular velocity data 220 sensed, measured and/or detected by the angular velocity sensor 208 may be of any type, form and/or format, and may be stored in a computer-readable storage medium such as the memory 212 of FIG. 2 described below. In some examples, the angular velocity data 220 sensed, measured and/or detected by the angular velocity sensor 208 may be provided to and/or made accessible to the controller 210 of FIG. 2 described below.

The example controller 210 of FIG. 2 manages and/or controls the operation of the MR rotary damper 206 of FIG. 2 based on the angular velocity data 220 described above, and further based on example angular velocity threshold data 222 and example correlation data 224. The controller 210 may be implemented by a semiconductor device such as a microprocessor, controller microcontroller. The controller 210 receives, obtains and/or accesses the angular velocity data 220, the angular velocity threshold data 222, and the correlation data 224 from one or more of the angular velocity sensor 208, the memory 212, and/or the user interface 214 of the steering apparatus 200 of FIG. 2.

The controller 210 of FIG. 2 determines and/or identifies an angular velocity associated with the steering wheel 204 and/or the steering column shaft 216 based on the angular velocity data 220 sensed, measured and/or detected by the angular velocity sensor 208. For example, the controller 210 may determine that the angular velocity associated with the steering wheel 204 and/or the steering column shaft 216 is eleven hundred degrees per second (1100°/s) based on the angular velocity data 220 sensed, measured and/or detected by the angular velocity sensor 208. In some examples, the controller 210 may determine and/or identify the angular velocity associated with the steering wheel 204 and/or the steering column shaft 216 by receiving the angular velocity data 220 directly from the angular velocity sensor 208 of FIG. 2. In other examples, the controller 210 may determine and/or identify the angular velocity associated with the steering wheel 204 and/or the steering column shaft 216 by obtaining and/or accessing the angular velocity data 220 from the memory 212 of FIG. 2.

The controller 210 of FIG. 2 compares the detected and/or identified angular velocity associated with the steering wheel 204 and/or the steering column shaft 216 to an angular velocity threshold to determine whether the angular velocity exceeds the angular velocity threshold. For example, the controller 210 may determine that the example angular velocity of eleven hundred degrees per second (1100°/s) described above exceeds an example angular velocity threshold of five hundred degrees per second (500°/s) and above. In some examples, the angular velocity threshold is associated with an occurrence of steering wheel jerk resulting from an off-road wheel impact. In some examples, the angular velocity threshold may be between five hundred degrees per second (500°/s) and thirty-two hundred degrees per second (3200°/s). In some examples, the angular velocity threshold corresponds to a torque of the steering column shaft 216 between three Newton meters (3 N·m) and fifteen Newton meters (15 N·m). The angular velocity threshold data 222 may be of any type, form and/or format, and may be stored in a computer-readable storage medium such as the memory 212 of FIG. 2 described below. In some examples, the controller 210 may obtain and/or access the angular velocity threshold data 222 from the memory 212 of FIG. 2. In other examples, the controller 210 may receive the angular velocity threshold data 222 directly from the user interface 214 of FIG. 2 described below.

In response to determining that the angular velocity associated with the steering wheel 204 and/or the steering column shaft 216 exceeds the angular velocity threshold, the controller 210 of FIG. 2 transmits a control signal to the MR rotary damper 206 of FIG. 2 to energize the MR rotary damper 206. In some examples, the control signal may include and/or be implemented as an electric current. As described above, the control signal transmitted by the controller 210 and received at the MR rotary damper 206 causes an electromagnet of the MR rotary damper 206 to generate a magnetic field. The MR rotary damper 206 applies the generated magnetic field to MR fluid housed by the MR rotary damper 206. The applied magnetic field changes the fluid properties (e.g., viscosity and/or shear strength) of the MR fluid, which in turn causes a change in the output torque produced at the output shaft 218 of the MR rotary damper 206 that is operatively coupled to the MR fluid. Thus, increasing the magnitude of the control signal (e.g., the magnitude of the electric current) transmitted by the controller 210 to the MR rotary damper 206 increases the magnitude and/or strength of the magnetic field generated by the electromagnet of the MR rotary damper 206, which in turn increases the viscosity and/or shear strength of the MR fluid, and increases the output torque produced at the output shaft 218 of the MR rotary damper 206.

In some examples, the control signal transmitted by the controller 210 of FIG. 2 to the MR rotary damper 206 of FIG. 2 varies in magnitude based on the measured and/or detected angular velocity determined and/or identified by the controller 210. In some examples, the controller 210 may determine the magnitude of the control signal to be transmitted by the controller 210 based on the correlation data 224 (e.g., a correlation list, table and/or matrix) accessed by the controller 210 from the memory 212 of FIG. 2. In some examples, the correlation data 224 correlates and/or associates the value of the measured and/or detected angular velocity determined and/or identified by the controller 210 with a value of the electric current of the control signal to be transmitted by the controller 210 to the MR rotary damper 206. In some examples, the correlation data 224 may further correlate and/or associate the value of the electric current of the control signal to be transmitted by the controller 210 to the MR rotary damper 206 with a value of the resultant output torque to be produced at the output shaft 218 of the MR rotary damper 206 in response to the transmitted control signal. The correlation data 224 accessed and/or utilized by the controller 210 may be of any format and may include any number of factors and/or fields.

FIG. 4 illustrates an example correlation table 400 that may be utilized by the example controller 210 of FIG. 2. In the illustrated example of FIG. 4, if the controller 210 determines and/or identifies a measured and/or detected angular velocity of eleven hundred degrees per second (1100°/s), the controller 210 accordingly determines, based on the correlation table 400, that a control signal having an electric current of 0.45 amps (0.45 A) is to be transmitted to the MR rotary damper 206. In such an example, the controller 210 may further determine that a resultant output torque of 6.0 Newton meters (6.0 N·m) will be produced at the output shaft 218 of the MR rotary damper 206 in response to the transmitted control signal. As another example, if the controller 210 determines and/or identifies a measured and/or detected angular velocity of two thousand degrees per second (2000°/s), the controller 210 accordingly determines, based on the correlation table 400, that a control signal having an electric current of 0.90 amps (0.90 A) is to be transmitted to the MR rotary damper 206, and that a resultant output torque of 10.5 Newton meters (10.5 N·m) be produced at the output shaft 218 of the MR rotary damper 206 in response to the transmitted control signal. The specific data values and/or data trends shown in the example correlation table 400 of FIG. 4 are merely exemplary. In other examples, data values and/or data trends may differ from those shown in the example correlation table 400 of FIG. 4.

Returning to the example of FIG. 2, the controller 210 of FIG. 2 may, in some examples, determine whether to discontinue the process by which the controller 210 manages and/or controls the operation of the MR rotary damper 206 of FIG. 2. For example, the controller 210 may obtain and/or receive data, information and/or signal(s) from the user interface 214 of FIG. 2 indicating that the process by which the controller 210 manages and/or controls the operation of the MR rotary damper 206 should be discontinued. If the controller 210 determines that the process by which the controller 210 manages and/or controls the operation of the MR rotary damper 206 should not be discontinued, the controller 210 continues managing and/or controlling the operation of the MR rotary damper 206 as described above (e.g., by determining the angular velocity associated with the steering wheel 204 and/or the steering column shaft 216, comparing the determined angular velocity to the angular velocity threshold, and transmitting a control signal to the MR rotary damper 206 in response to determining that the angular velocity exceeds the angular velocity threshold). If the controller 210 instead determines that the process by which the controller 210 manages and/or controls the operation of the MR rotary damper 206 should be discontinued, the controller 210 ceases transmitting control signals to the MR rotary damper 206.

Returning to the example of FIG. 2, the memory 212 of FIG. 2 may be implemented by any type(s) and/or any number(s) of storage devices) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 212 may be stored in any file and/or data structure format, organization scheme, and/or arrangement.

Data and/or information received by the memory 212 from any of the angular velocity sensor 208, the controller 210, and/or the user interface 214 of FIG. 2 may be stored in the memory 212. For example, the memory 212 may store the example angular velocity data 220, the example angular velocity threshold data 222, and/or the example correlation data 224 of FIG. 2 described above. Data and/or information stored in the memory 212 is accessible to the controller 210 and/or the user interface 214 of FIG. 2.

The example user interface 214 of FIG. 2 facilitates interactions and/or communications between a user (e.g., a driver) of a vehicle implementing the steering apparatus 200 of FIG. 2, and the controller 210 and/or the memory 212 of FIG. 2. Data and/or information that is presented and/or received via the user interface 214 may be of any type, form and/or format, and may be stored in a computer-readable storage medium such as the memory 212 of FIG. 2 described above.

The user interface 214 of FIG. 2 includes one or more input device(s) 226 via which the user may input information and/or data to the controller 210 and/or the memory 212 of FIG. 2. For example, the user interface 214 may include a button, a switch, a keypad, a microphone, and/or a touchscreen that enable(s) the user to convey data and/or commands to the controller 210 and/or memory 212. In some examples, the example angular velocity threshold data 222 and/or the example correlation data 224 described above may be entered and/or configured via the one or more input device(s) 226 of the user interface 214. In some examples, an indication to discontinue the process by which the controller 210 of FIG. 2 manages and/or controls the operation of the MR rotary damper 206 of FIG. 2 may be entered via, the one or more input device(s) 226 of the user interface 214.

The user interface 214 of FIG. 2 also includes one or more output device(s) 228 via which the controller 210 of FIG. 2 presents information and/or data in visual and/or audible form to the user of the vehicle. For example, the user interface 214 may include a light emitting diode, a touchscreen, and/or a liquid crystal display for presenting visual information, and/or a speaker for presenting audible information. In some examples, the example angular velocity data 220, the example angular velocity threshold data 222, and/or the example correlation data 224 of FIG. 2 described above may be presented via the one or more output device(s) 228 of the user interface 214.

While an example manner of implementing the example steering apparatus 200 is illustrated in FIG. 2, one or more of the elements, processes and/or devices illustrated in FIG. 2 may be combined, divided, re-arranged, omitted, eliminated and/or implemented in any other way. Further, the example angular velocity sensor 208, the example controller 210, the example memory 212, and/or the example user interface 214 of FIG. 2 may be implemented by hardware, software, firmware anchor any combination of hardware, software and/or firmware. Thus, for example, any of the example angular velocity sensor 208, the example controller 210, the example memory d/or the example user interface 214 of FIG. 2 could be implemented by one or more analog or digital circuit(s), logic circuits, programmable processor(s), application specific integrated circuit(s) (ASIC(s)), programmable logic devices) (PLD(s)) and/or field programmable logic device(s) (FPLD(s)). When reading any of the apparatus or system claims of this patent to cover a purely software and/or firmware implementation, at least one of the example angular velocity sensor 208, the example controller 210, the example memory 212, and/or the example user interface 214 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example steering apparatus 200 of FIG. 2 may include one or more elements, processes and/or devices in addition to, or instead of, those illustrated in FIG. 2, and/or may include more than one of any or all of the illustrated elements, processes and devices.

Figure 5:
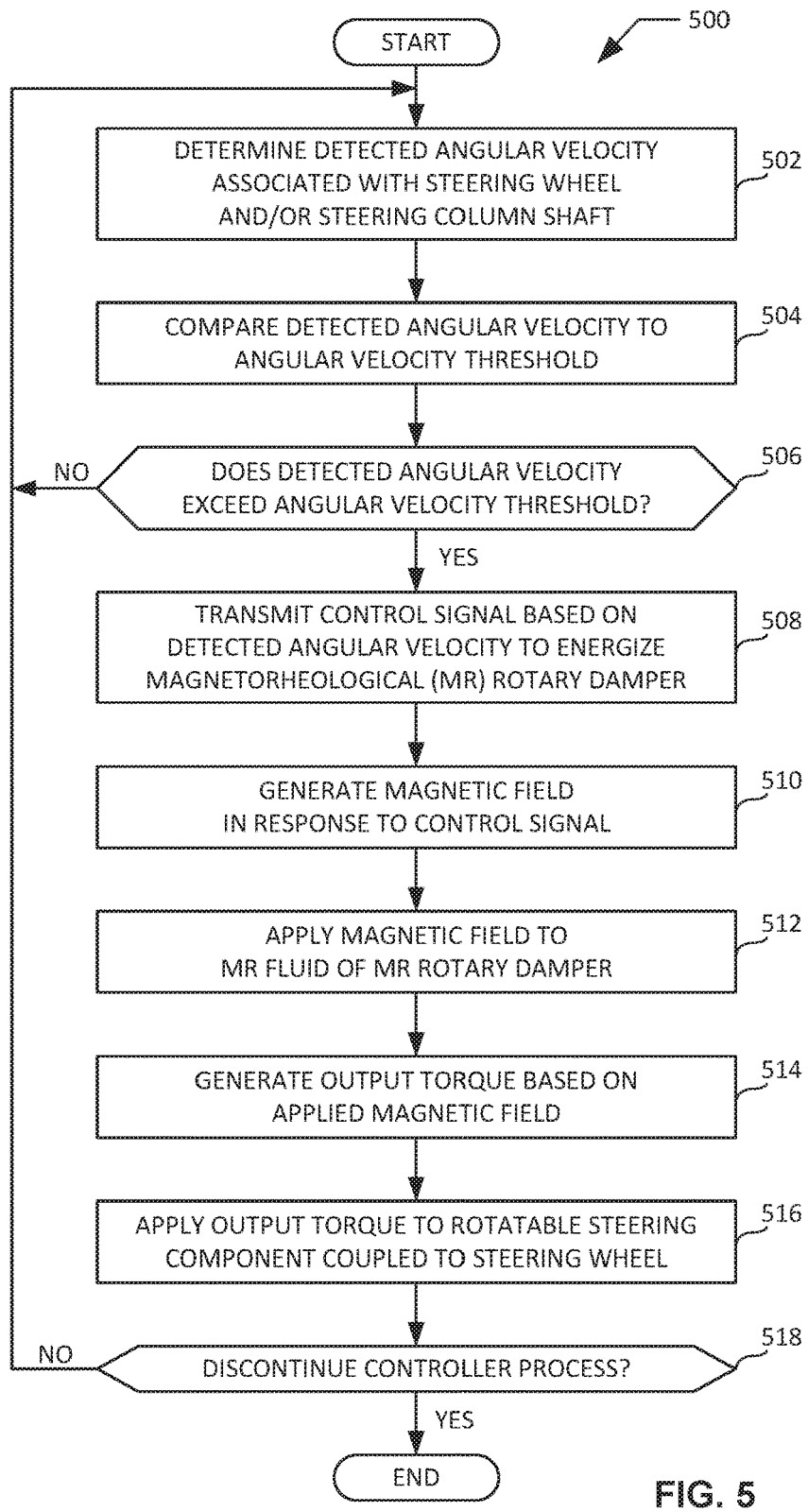
FIG. 5 is a flowchart representative of an example method that may be executed with the example steering apparatus of FIG. 2 to reduce steering wheel jerk resulting from off-road wheel impact.
Figure 6:
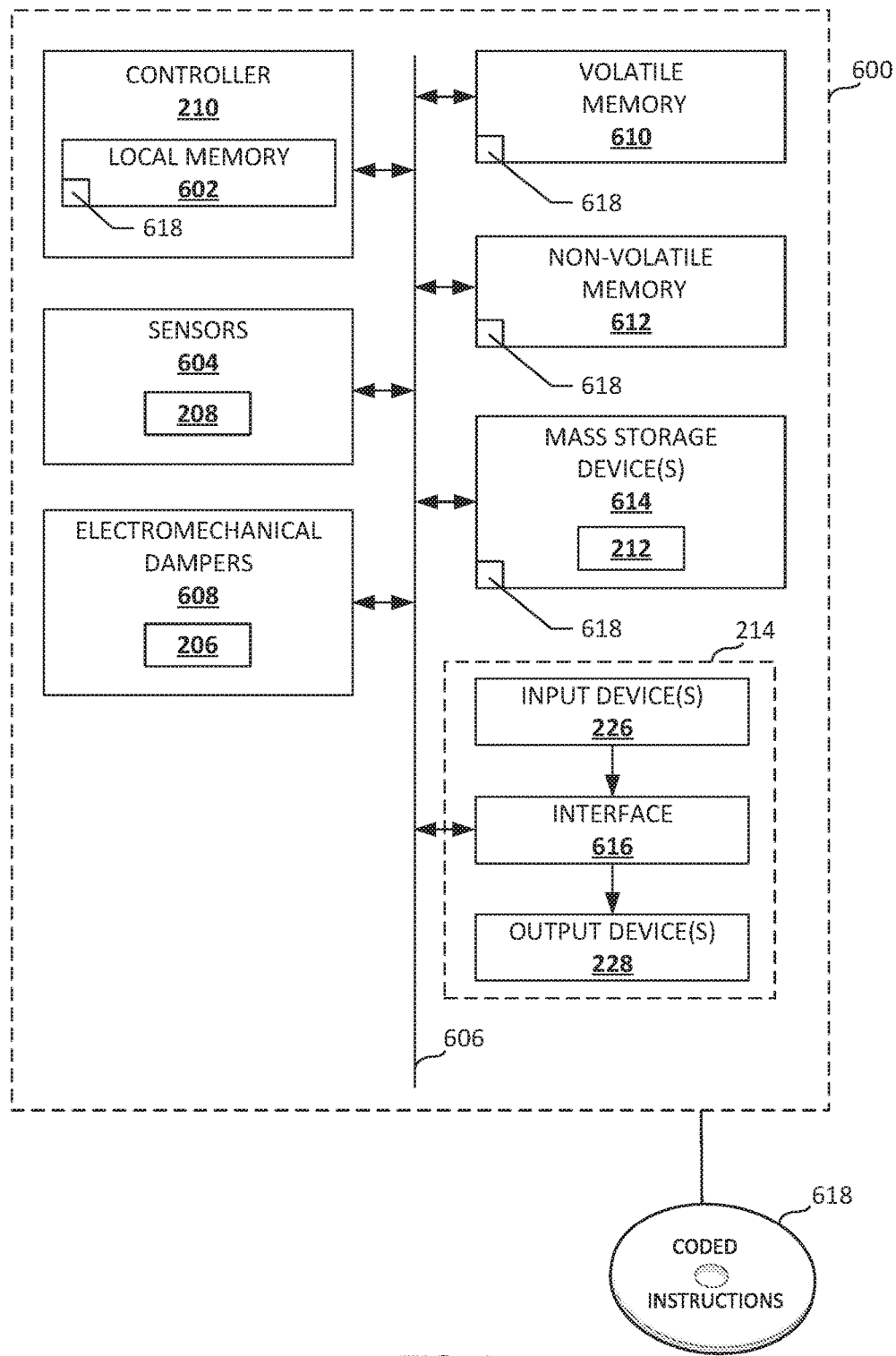
FIG. 6 is an example processor platform capable of executing instructions to implement the example method of FIG. 5 and the example steering apparatus of FIG. 2.

A flowchart representative of an example method that may be implemented via the example steering apparatus 200 of FIG. 2 to reduce steering wheel jerk resulting from off-road wheel impact is shown in FIG. 5, in this example, the method may be implemented using machine-readable instructions that comprise one or more program(s) for execution by a controller or processor such as the example controller 210 of FIG. 2 described above and shown in the example processor platform 600 discussed below in connection with FIG. 6. The one or more program(s) may be embodied in software stored on a tangible computer readable storage medium such as a CD-ROM, a floppy disk, a hard drive, a digital versatile disk (DVD), a Blu-ray disk, or a memory associated with the controller 210, but the entire program(s) and/or parts thereof could alternatively be executed by a device other than the controller 210 and/or embodied in firmware or dedicated hardware. Further, although the example program(s) is/are described with reference to the flowchart illustrated in FIG. 5, many other methods for implementing the example steering apparatus 200 of FIG. 2 to reduce steering wheel jerk resulting from off-road wheel impact may alternatively be used. For example, the order of execution of the blocks may be changed, and/or some of the blocks described may be changed, eliminated, or combined.

As mentioned above, the example method of FIG. 5 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 5 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flowchart representative of an example method 500 that may be executed with the example steering apparatus 200 of FIG. 2 to reduce steering wheel jerk resulting from off-road wheel impact. The example method 500 of FIG. 5 begins when the controller 210 of FIG. 2 determines and/or identifies a detected angular velocity associated with the steering wheel 204 and/or the steering column shaft 216 of the steering apparatus 200 of FIG. 2 (block 502). For example, the controller 210 may determine that the angular velocity associated with the steering wheel 204 and/or the steering column shaft 216 is eleven hundred degrees per second (1100°/s) based on the angular velocity data 220 sensed, measured and/or detected by the angular velocity sensor 208 of FIG. 2.

The controller 210 of FIG. 2 compares the detected and/or identified angular velocity to an angular velocity threshold (block 504). For example, the controller 210 may compare a detected angular velocity of eleven hundred degrees per second (1100°/s) to angular velocity threshold data 222 having an angular velocity threshold of five hundred degrees per second (500°/s).

The controller 210 of FIG. 2 determines whether the detected and/or identified angular velocity exceeds the angular velocity threshold (block 506). For example, the controller 210 may determine that a detected angular velocity of eleven hundred degrees per second (1100°/s) exceeds an angular velocity threshold of five hundred degrees per second (500°/s). If the controller 210 determines at block 506 that the detected angular velocity does not exceed the angular velocity threshold, control of the example method 500 returns to block 502. If the controller 210 instead determines at block 506 that the detected angular velocity exceeds the angular velocity threshold, control of the example method 500 proceeds to block 508.

At block 508, the controller 210 of FIG. 2 energizes the MR rotary damper 206 of FIG. 2 by transmitting a control signal to the MR rotary damper 206 based on the detected and/or identified angular velocity (block 508). For example, in response to determining at block 506 that a detected angular velocity of eleven hundred degrees per second (1100°/s) exceeds an angular velocity threshold of five hundred degrees per second (500°/s), the controller 210 may energize the MR rotary damper 206 by transmitting a control signal having an electric current of 0.45 amps (0.45 A). In some examples, the controller 210 determines the magnitude of the control signal based on correlation data 224 such as the example correlation table 400 of FIG. 4.

The MR rotary damper 206 of FIG. 2 generates a magnetic field in response to the control signal (block 510). For example, the MR rotary damper 206 may generate a magnetic field having a magnitude corresponding to the 0.45 amp (0.45 A) control signal transmitted to the MR rotary damper 206 from the controller 210 of FIG. 2.

The MR rotary damper 206 of FIG. 2 applies the magnetic field to MR fluid of the MR rotary damper 206 (block 512). For example, the MR rotary damper 206 may apply a magnetic field to the MR fluid that results in a change in the fluid properties (e.g., viscosity and/or shear strength) of the MR fluid.

The MR rotary damper 206 of FIG. 2 generates an output torque based on the applied magnetic field (block 514). For example, the MR rotary damper 206 may generate an output torque of 6.0 Newton meters (6.0 N·m) based on an applied magnetic field having a magnitude corresponding to the 0.45 amp (0.45 A) control signal transmitted to the MR rotary damper 206 from the controller 210 of FIG.

The MR rotary damper 206 of FIG. 2 applies the output torque to a rotatable steering component (e.g., the steering column shaft 216, an intermediate shaft, a steering pinion gear, etc.) coupled (e.g., directly or indirectly) to the steering wheel 204 of FIG. 2 (block 516). For example, the MR rotary damper 206 may apply the output torque to the steering column shaft 216 of the steering column assembly 202 of FIG. 2. In some examples, the MR rotary damper 206 may be mounted to the steering column assembly 202, and the output torque of the MR rotary damper 206 may be transferred from the output shaft 218 of the MR rotary damper 206 to the steering column shaft 216 of the steering column assembly 202 via the belt and pulley system 308 of FIG. 3.

Following block 516, the controller 210 of FIG. 2 determines whether to discontinue the process by which the controller 210 manages and/or controls the MR rotary damper 206 of FIG. 2 (block 518). For example, the controller 210 may obtain and/or receive data, information and/or signal(s) from the user interface 214 of FIG. 2 indicating that the process by which the controller 210 manages and/or controls the MR rotary damper 206 should be discontinued. If the controller 210 determines at block 518 that the process by which the controller 210 manages and/or controls the MR rotary damper 206 should not be discontinued, control of the example method 500 returns to block 502. If the controller 210 instead determines at block 518 that the process by which the controller 210 manages and/or controls the MR rotary damper 206 should be discontinued, the example method 500 ends.

FIG. 6 is an example processor platform 600 capable of executing instructions to implement the example method 500 of FIG. 5 and the example steering apparatus 200 of FIG. 2. The processor platform 600 of the illustrated example includes the controller 210 of FIG. 2. The controller 210 of the illustrated example is hardware. For example, the controller 210 can be implemented by one or more integrated circuits, logic circuits, processors, microprocessors, controllers or microcontrollers from any desired family or manufacturer. The controller 210 of the illustrated example includes a local memory 602 (e.g., a cache).

The controller 210 of the illustrated example is in communication with one or more example sensor(s) 604 via a bus 606 (e.g., a controller area network (CAN) bus). The example sensor(s) 604 include the example angular velocity sensor 200 of FIG. 2. The controller 210 of the illustrated example is also in communication with one or more example electromechanical damper(s) 608 via the bus 606. The example electromechanical damper(s) 608 include the example MR rotary damper 206 of FIG. 2.

The controller 210 of the illustrated example is also in communication with a main memory including a volatile memory 610 and a non-volatile memory 612 via the bus 606. The volatile memory 610 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 612 may be implemented by flash memory and/or any other desired type of memory device. Access to the volatile memory 610 and the non-volatile memory 612 is controlled by a memory controller.

The controller 210 of the illustrated example is also in communication with one or more mass storage device(s) 614 for storing software and/or data. Example mass storage device(s) 614 include floppy disk drives, hard drive disks, compact disk drives, Blu-ray disk drives, RAID systems, and digital versatile disk (DVD) drives. The example mass storage device(s) 614 include the example memory 212 of FIG. 2.

The processor platform 600 of the illustrated example also includes an interface circuit 616. The interface circuit 616 may be implemented by any type of interface standard, such as an Ethernet interface, a universal serial bus (USB), and/or a PCI express interface. In the illustrated example, one or more input device(s) 226 are connected to the interface circuit 616. The input device(s) 226 permit(s) a user to enter data and commands into the controller 210 and/or the memory 212. The input device(s) 226 can be implemented by, for example, a button, a switch, a keypad, a touchscreen, an audio sensor, a camera (still or video), a track-pad, a trackball, isopoint, a voice recognition system, a microphone, and/or a liquid crystal display. One or more output device(s) 228 are also connected to the interface circuit 616 of the illustrated example. The output device(s) 228 can be implemented, for example, by a light emitting diode, an organic light emitting diode, a liquid crystal display, a touchscreen and/or a speaker. The interface circuit 616 of the illustrated example may, thus, include a graphics driver such as a graphics driver chip and/or processor. In the illustrated example, the input device(s) 226, the output device(s) 228 and the interface circuit 616 collectively form the example user interface 214 of FIG. 2.

Coded instructions 618 for implementing the example method 500 of FIG. 5 may be stored in the local memory 602, in the volatile memory 610, in the non-volatile memory 612, in the mass storage device 614, and/or on a removable tangible computer readable storage medium such as a CD or DVD.

From the foregoing, it will be appreciated that the disclosed magnetorheological-damper-based steering apparatus and methods advantageously reduce steering wheel jerk resulting from off-road wheel impact. For example, the disclosed magnetorheological-damper-based steering apparatus and methods incorporate a magnetorheological (MR) rotary damper to dampen occurrences of steering wheel jerk, thereby reducing the potential for temporary loss of directional control of the vehicle, and/or injury to the driver of the vehicle, that exist in connection with conventional steering systems. The disclosed steering apparatus and methods include an MR rotary damper that is energized by a controller in response to the controller determining that a measured angular velocity associated with a steering wheel and/or a steering column, shaft of the steering apparatus exceeds an angular velocity threshold corresponding to an occurrence of steering wheel jerk.

In some examples, a steering damper apparatus is disclosed. In some disclosed examples, the steering damper apparatus comprises a magnetorheological (MR) rotary damper to be operatively coupled to a steering column shaft. In some disclosed examples, the steering damper apparatus comprises a sensor to detect an angular velocity associated with the steering column shaft. In some disclosed examples, the steering damper apparatus comprises a controller to energize the MR rotary damper in response to determining that the angular velocity exceeds an angular velocity threshold. In some disclosed examples, the angular velocity threshold is associated with steering wheel jerk resulting from an off-road wheel impact.

In some disclosed examples, the angular velocity threshold is between 500 degrees per second and 3200 degrees per second. In some disclosed examples, the angular velocity threshold is associated with a steering column shaft torque between 3 N·m and 15 N·m.

In some disclosed examples, the controller is to energize the MR rotary damper by transmitting a control signal to the MR rotary damper. In some disclosed examples, the MR rotary damper is to generate a magnetic field in response to the control signal. In some disclosed examples, the magnetic field is to be applied to a MR fluid housed in the MR rotary damper. In some disclosed examples, an output torque of the MR rotary damper to be applied to the steering column shaft is to increase in response to the magnetic field being applied to the MR fluid. In some disclosed examples, an output torque of the MR rotary damper to be applied to the steering column shaft in response to the magnetic field being applied to the MR fluid is between 3 N·m and 15 N·m.

In some disclosed examples, the MR rotary damper is mounted to a steering column assembly. In some disclosed examples, an output shaft of the MR rotary damper is offset from the steering column shaft. In some disclosed examples, the output shaft of the MR rotary damper is operatively coupled to the steering column shaft via a belt and pulley system.

In some disclosed examples, a method for reducing steering wheel jerk resulting from off-road wheel impact is disclosed. In some disclosed examples, the method comprises detecting, via a sensor, an angular velocity associated with a steering column shaft. In some disclosed examples, the method comprises comparing, by executing one or more instructions via a controller, the angular velocity to an angular velocity threshold. In some disclosed examples, the angular velocity threshold is associated with steering wheel jerk resulting from an off-road wheel impact. In some disclosed examples, the method comprises energizing, by executing one or more instructions via the controller, a magnetorheological (MR) rotary damper in response to determining that the angular velocity exceeds the angular velocity threshold. In some disclosed examples, the MR rotary damper is operatively coupled to the steering column shaft.

In some disclosed examples, the angular velocity threshold is between 500 degrees per second and 3200 degrees per second. In some disclosed examples, the angular velocity threshold is associated with a steering column shaft torque between 3 N·m and 15 N·m.

In some disclosed examples, the energizing of the MR rotary damper includes transmitting a control signal to the MR rotary damper. In some disclosed examples, the MR rotary damper generates a magnetic field in response to the control signal. In some disclosed examples, the magnetic field is applied to a MR fluid housed in the MR rotary damper. In some disclosed examples, an output torque of the MR rotary damper applied to the steering column shaft is to increase in response to the magnetic field being applied to the MR fluid. In some disclosed examples, an output torque of the MR rotary damper applied to the steering column shaft in response to the magnetic field being applied to the MR fluid is between 3 N·m and 15 N·m.

In some examples, a tangible machine readable storage medium comprising instructions is disclosed. In some disclosed examples, the instructions, when executed, cause a controller to compare an angular velocity detected via a sensor to an angular velocity threshold. In some disclosed examples, the angular velocity is associated with a steering column shaft. In some disclosed examples, the angular velocity threshold is associated with steering wheel jerk resulting from an off-road wheel impact. In some disclosed examples, the instructions, when executed, cause the controller to energize a magnetorheological (MR) rotary damper in response to determining that the angular velocity exceeds the angular velocity threshold. In some disclosed examples, the MR rotary damper is operatively coupled to the steering column shaft.

In some disclosed examples, the angular velocity threshold is between 500 degrees per second and 3200 degrees per second. In some disclosed examples, the angular velocity threshold is associated with a steering column shaft torque between 3 N·m and 15 N·m.

In some disclosed examples, the instructions, when executed, are to cause the controller to energize the MR rotary damper by transmitting a control signal to the MR rotary damper. In some disclosed examples, the MR rotary damper generates a magnetic field in response to the control signal. In some disclosed examples, the magnetic field is applied to a MR fluid housed in the MR rotary damper. In some disclosed examples, an output torque of the MR rotary damper applied to the steering column shaft is to increase in response to the magnetic field being applied to the MR fluid. In some disclosed examples, an output torque of the MR rotary damper applied to the steering column shaft in response to the magnetic field being applied to the MR fluid is between 3 N·m and 15 N·m.

Although certain example methods, apparatus and articles of manufacture have been disclosed herein, the scope of coverage of this patent is not limited thereto. On the contrary this patent covers all methods, apparatus and articles of manufacture fairly falling within the scope of the claims of this patent.

What is claimed is:

1. A steering damper apparatus comprising:
a magnetorheological (MR) rotary damper mounted to a steering column assembly, the MR rotary damper including an output shaft offset from a steering column shaft, the output shaft operatively coupled to the steering column shaft via a belt and pulley system;
a sensor to detect an angular velocity associated with the steering column shaft; and
a controller to energize the MR rotary damper in response to determining that the angular velocity exceeds an angular velocity threshold, the angular velocity threshold being associated with steering wheel jerk resulting from an off-road wheel impact.

2. The steering damper apparatus of claim 1, wherein the angular velocity threshold is between 500 degrees per second and 3200 degrees per second.

3. The steering damper apparatus of claim 1, wherein the angular velocity threshold is associated with a steering column shaft torque between 3 N·m and 15 N·m.

4. The steering damper apparatus of claim 1, wherein the controller is to energize the MR rotary damper by transmitting a control signal to the MR rotary damper, the MR rotary damper to generate a magnetic field in response to the control signal, the magnetic field to be applied to a MR fluid housed in the MR rotary damper.

5. The steering damper apparatus of claim 4, wherein an output torque of the MR rotary damper to be applied to the steering column shaft is to increase in response to the magnetic field being applied to the MR fluid.

6. The steering damper apparatus of claim 4, wherein an output torque of the MR rotary damper to be applied to the steering column shaft in response to the magnetic field being applied to the MR fluid is between 3 N·m and 15 N·m.

7. A method comprising:
detecting, via a sensor, an angular velocity associated with a steering column shaft;
comparing, by executing one or more instructions via a controller, the angular velocity to an angular velocity threshold, the angular velocity threshold being associated with steering wheel jerk resulting from an off-road wheel impact; and
energizing, by executing one or more instructions via the controller, a magnetorheological (MR) rotary damper in response to determining that the angular velocity exceeds the angular velocity threshold, the MR rotary damper mounted to a steering column assembly, the MR rotary damper including an output shaft offset from the steering column shaft, the output shaft operatively coupled to the steering column shaft via a belt and pulley system.

8. The method of claim 7, wherein the angular velocity threshold is between 500 degrees per second and 3200 degrees per second.

9. The method of claim 7, wherein the angular velocity threshold is associated with a steering column shaft torque between 3 N·m and 15 N·m.

10. The method of claim 7, wherein the energizing of the MR rotary damper includes transmitting a control signal to the MR rotary damper, the MR rotary damper to generate a magnetic field in response to the control signal, the magnetic field to be applied to a MR fluid housed in the MR rotary damper.

11. The method of claim 10, wherein an output torque of the MR rotary damper to be applied to the steering column shaft is to increase in response to the magnetic field being applied to the MR fluid.

12. The method of claim 10, wherein an output torque of the MR rotary damper to be applied to the steering column shaft in response to the magnetic field being applied to the MR fluid is between 3 N·m and 15 N·m.

13. A tangible, non-transitory, machine readable storage medium comprising instructions that, when executed, cause a controller to at least:
compare an angular velocity detected via a sensor to an angular velocity threshold, the angular velocity being associated with a steering column shaft, the angular velocity threshold being associated with steering wheel jerk resulting from an off-road wheel impact; and
energize a magnetorheological (MR) rotary damper in response to determining that the angular velocity exceeds the angular velocity threshold, the MR rotary damper mounted to a steering column assembly, the MR rotary damper including an output shaft offset from the steering column shaft, the output shaft operatively coupled to the steering column shaft via a belt and pulley system.

14. The tangible, non-transitory, machine readable storage medium of claim 13, wherein the angular velocity threshold is between 500 degrees per second and 3200 degrees per second.

15. The tangible, non-transitory, machine readable storage medium of claim 13, wherein the angular velocity threshold is associated with a steering column shaft torque between 3 N·m and 15 N·m.

16. The tangible, non-transitory, machine readable storage medium of claim 13, wherein the instructions, when executed, are to cause the controller to energize the MR rotary damper by transmitting a control signal to the MR rotary damper, the MR rotary damper to generate a magnetic field in response to the control signal, the magnetic field to be applied to a MR fluid housed in the MR rotary damper.

17. The tangible, non-transitory, machine readable storage medium of claim 16, wherein an output torque of the MR rotary damper to be applied to the steering column shaft is to increase in response to the magnetic field being applied to the MR fluid.

18. The tangible, non-transitory, machine readable storage medium of claim 16, wherein an output torque of the MR rotary damper to be applied to the steering column shaft in response to the magnetic field being applied to the MR fluid is between 3 N·m and 15 N·m.

19. A steering damper apparatus comprising:
a magnetorheological (MR) rotary damper operatively coupled to a steering column shaft of a steering column assembly;
an angular velocity sensor operatively coupled to the steering column shaft, the angular velocity sensor to detect an angular velocity of with the steering column shaft; and
a controller to energize the MR rotary damper in response to determining that the angular velocity exceeds an angular velocity threshold, the angular velocity threshold being associated with steering wheel jerk resulting from an off-road wheel impact.

20. The steering damper apparatus of claim 19, wherein the MR rotary damper is mounted to the steering column assembly, the MR rotary damper including an output shaft offset from the steering column shaft, the output shaft operatively coupled to the steering column shaft via a belt and pulley system.

* * * * *